United States Patent [19]

Ishida et al.

[11] Patent Number: 5,566,274

[45] Date of Patent: Oct. 15, 1996

[54] METHOD AND APPARATUS FOR SETTING MEMBERSHIP FUNCTIONS, AND METHOD AND APPARATUS FOR ANALYZING SAME

[75] Inventors: Tsutomu Ishida; Kazuaki Urasaki, both of Kyoto, Japan

[73] Assignee: Omron Corporation, Kyoto-fu, Japan

[21] Appl. No.: 768,939

[22] PCT Filed: Apr. 24, 1990

[86] PCT No.: PCT/JP90/00529

§ 371 Date: Dec. 17, 1991

§ 102(e) Date: Dec. 17, 1991

[87] PCT Pub. No.: WO90/13868

PCT Pub. Date: Nov. 15, 1990

[30] Foreign Application Priority Data

Apr. 28, 1989 [JP] Japan .................................. 1-107506
Aug. 31, 1989 [JP] Japan .................................. 1-223271

[51] Int. Cl.⁶ .................................................. G06F 9/44
[52] U.S. Cl. .................................. 395/61; 395/3; 395/51
[58] Field of Search .............................. 395/900, 61, 3, 395/51

[56] References Cited

U.S. PATENT DOCUMENTS

| | | | |
|---|---|---|---|
| 3,618,027 | 11/1971 | Feng | 395/61 |
| 3,760,161 | 9/1973 | Lohne et al. | 235/462 |
| 4,875,184 | 10/1989 | Yamakawa | 364/602 |
| 5,113,366 | 5/1992 | Yamakawa | 395/3 |

*Primary Examiner*—George B. Davis
*Attorney, Agent, or Firm*—Dickstein Shapiro Morin & Oshinsky, LLP

[57] ABSTRACT

A check is made to determine whether there is identity among set membership functions, different numbers are assigned to mutually different membership functions, and identical numbers are assigned to membership functions which are mutually identical. These membership functions are stored in memory in correlation with their numbers, labels and the names of input or output variables.

8 Claims, 7 Drawing Sheets

Fig.2

| VARIABLE NAME | I/O | RANGE OF VARIATION | LABELS USED |
|---|---|---|---|
| $I_1$ | I | $-5.0 \sim +5.0$ (V) | NL, NM, NS, ZR, PS, PM, PL |
| $I_2$ | I | $-3.0 \sim +3.0$ (A) | NL, NM, ZR, PS, PM, PL |
| $I_3$ | I | $0 \sim +5.0$ (V) | ZR, PM, PL |
| $I_4$ | I | $-5.0 \sim +5.0$ (V) | N, Z, P |
| $O_1$ | O | $-5.0 \sim +5.0$ (V) | NL, NM, NS, ZR, PS, PM, PL |
| $O_2$ | O | $-5.0 \sim +5.0$ (V) | NEG, POS |

Fig.5

| INPUT/OUTPUT VARIABLE NAMES | MEMBERSHIP FUNCTION | |
| --- | --- | --- |
| | LABEL | NO. |
| $I_1$ (N 3 Z 3 P) | N L | 3 |
| | N M | 4 |
| | N S | 5 |
| | Z R | 9 |
| | P S | 1 3 |
| | P M | 1 4 |
| | P L | 1 5 |
| $I_2$ (N 2 Z 3 P) | N L | 1 |
| | N M | 2 |
| | Z R | 8 |
| | P S | 1 3 |
| | P M | 1 4 |
| | P L | 1 5 |
| $I_3$ (Z 2 P) | Z R | 6 |
| | P M | 1 1 |
| | P L | 1 2 |
| $I_4$ (N 1 Z 1 P) | N | 0 |
| | Z | 7 |
| | P | 1 0 |
| $O_1$ (N 3 Z 3 P) | N L | 3 |
| | N M | 4 |
| | N S | 5 |
| | Z R | 9 |
| | P S | 1 3 |
| | P M | 1 4 |
| | P L | 1 5 |
| $O_2$ (N 1 P) | N E G | 1 6 |
| | P O S | 1 7 |

Fig. 6

| INPUT/OUTPUT VARIABLE | $I_1$ | $I_2$ | $I_3$ | $I_4$ | $O_1$ | $O_2$ |
|---|---|---|---|---|---|---|
| CODE | 0 | 1 | 2 | 3 | 4 | 5 |

METHOD AND APPARATUS FOR SETTING MEMBERSHIP FUNCTIONS, AND METHOD AND APPARATUS FOR ANALYZING SAME

TECHNICAL FIELD

This invention relates to a method and apparatus for setting membership functions in a system for executing fuzzy reasoning, in accordance with a modus ponens inference format, referred to using such names as fuzzy inference units and fuzzy controllers, and relates also to a method and apparatus for analyzing these membership functions.

BACKGROUND ART

Fuzzy reasoning rules in accordance with a modus ponens inference format generally are written in an "If, . . . , then . . ." format, and are accompanied by membership functions. In order to set these rules, it is necessary to set (or register) the membership functions.

Let input variables be expressed by $I_1$–$I_n$, and output variables by $O_1$–$O_m$. Membership functions often are represented by labels NL, NM, NS, ZR, PS, PM, PL, which express the characterizing features of the functions. Here N represents negative, and P, L, M, S, and ZR represent positive, large, medium, small and zero, respectively. For example, NL, which stands for "negative large", represents a fuzzy see (membership function) in which the particular concept is defined by the linguistic information "a negative, large value". In addition, PS represents a positive, small value, and ZR represents approximately zero. The items of linguistic information which represent the characterizing features of these membership functions are referred to as "labels" hereinbelow.

One method of setting membership functions in the programming of reasoning rules according to the prior art is to define membership functions, with regard to respective ones of the labels used, for every input variable and output variable. Specifically, seven types of membership functions $NLI_p$, $NMI_p$, . . . , $PLI_p$ are defined for each input variable $I_p$ (p=1–n), and seven types of membership functions $NL_{Oq}$, $NM_{Oq}$, . . . , $PL_{Oq}$ are defined for each output variable $O_q$ (q=1–m). The advantage of this method is that membership functions of desired forms can be defined for every input variable, output variable and label, and it is possible to finely adjust each one. A disadvantage which can be mentioned is that a large capacity memory is required as the membership-function memory. For example, if the region of a variable of one membership function is divided into 256 portions and a function value is represented by eight bits (256 stages) for every subdivision of the variable resulting from division, then a capacity of 2 Kbits (256×8=2,048) per membership function will be required. If the number of types of input variables is 10 (n=10), the number of types of output variables is 2 (m=2) and seven types of membership functions are set for each of the input and output variables, then the memory capacity necessary will be 10×2×(2 K)×7= 280 Kbits. This method involves other problems as well, such as the need to set a large number of membership functions (20×7=140 types), which is laborious and troublesome.

Another method is to use the same membership functions for all of the input and output variables. Memory capacity required in accordance with this method is only (2 K)×7= 14 Kbits, and the setting of seven types of membership functions will suffice. However, since the forms of the membership functions are already decided, a drawback is that a fine adjustment cannot be made.

Still another method is to create the necessary membership functions in advance and assign different codes (numbers) to respective ones of these membership functions. For example, in a case where 27 types of membership functions are necessary, these are created and stored in memory, and identification codes are assigned to them in the manner $MF_1$, $MF_2$, . . . , $MF_{27}$. As a result, the required capacity of the memory can be reduced to the minimum. In accordance with this method, rules are expressed using the identification numbers, as follows:

If $I_1 = MF_5$, $I_2 = MF_{13}$, . . . , and $I_n = MF_6$, then $O_1 = MF_9$

According to this method, labels cannot be used in the rules in order to designate the membership functions. Therefore, a problem which arises is that the description of rules is very difficult to understand.

On the other hand, in the application of a fuzzy reasoning apparatus, how to set inference rules and membership functions that are appropriate for the controlled system is an important problem. In addition, analyzing what role rules and membership functions, once they have been set, play in fuzzy reasoning, as well as how a plurality of set rules and membership functions are interrelated, is an essential matter in order to refine upon and improve fuzzy reasoning control.

However, research concerning the applications of fuzzy reasoning has only just begun, and the state of the art is such that adequate research has not yet been carried out.

DISCLOSURE OF THE INVENTION

An object of the present invention is to provide a method and apparatus for setting membership functions, in which labels (linguistic information) that are easy to handle and understand can be used in order to set membership functions, and in which memory capacity for storing membership functions can be reduced.

Another object of the present invention is to provide a novel method and apparatus capable of analyzing the relationship among a plurality of set membership functions.

An apparatus for setting membership functions according to the present invention is characterized by comprising means for checking whether there is identity among membership functions set for each input and output variable and for each identification code, means for assigning different numbers to different set membership functions and identical numbers to membership functions possessing identity, first memory means for storing data, which represents a set membership function, in correspondence with the number assigned thereto, and second memory means for correlating and storing the numbers assigned to the membership functions, identification codes of the membership functions which correspond to these numbers, and names of the input or output variables.

A method of setting membership functions according to the present invention is characterized by checking whether there is identity among membership functions set for each input and output variable and for each identification code, assigning different numbers to different set membership functions and identical numbers to membership functions possessing identity, storing, in first memory means, data representing a set membership function in correspondence with the number assigned thereto, and correlating and storing, in second memory means, the numbers assigned to the membership functions, identification codes of the membership functions which correspond to these numbers, and names of the input or output variables.

In accordance with the present invention, a check is performed to determine whether there is identity among set membership functions (namely whether they are identical in shape or resemble one another to the extent that their control capabilities can be considered identical), and membership functions exhibiting identity are refrained from being registered redundantly. Accordingly, it is possible to reduce the capacity of the memory which stores (registers) the data representing the membership functions.

On the other hand, different numbers are assigned to different membership functions, and data representing the membership functions is stored in memory in correspondence with these numbers. In addition, data is stored which represents the correlation among the numbers assigned to the membership functions, the identification codes of these membership functions, and the names of the input or output variables. It is possible to use linguistic information (labels) as the identification codes. Accordingly, the operator is capable of setting and inputting rules using the names of the input and output variables and the linguistic information of the membership functions and thus is furnished with a man/machine interface that is easy to use.

A method and apparatus for analyzing membership functions according to the present invention can be used in the above-described method and apparatus for setting membership functions in order to check whether there is identity (or resemblance) among set membership functions. Of course, the method and apparatus for analyzing membership functions according to the invention is applicable also to an ordinary fuzzy reasoning system.

The apparatus for analyzing membership functions according to the present invention is characterized by comprising means for calculating degree of resemblance between two membership functions by correlating membership functions, and means for comparing the calculated degree of resemblance (inclusive of identity) with a predetermined reference value and outputting membership functions judged to at least resemble each other.

If necessary, means may be provided for deleting one of the membership functions judged to resemble each other. An arrangement may be adopted in which the operator, upon observing the data relating to the resemblance of the outputted membership functions, is capable of entering a delete command when it is judged that a membership function should be deleted, or in which such a membership function is deleted automatically.

A method of analyzing a membership function according to the invention is characterized by calculating degree of resemblance between two membership functions by correlating membership functions, and comparing the calculated degree of resemblance (inclusive of identity) with a predetermined reference value and outputting membership functions judged to at least resemble each other.

In accordance with the invention, an objective degree of resemblance between two membership functions is calculated, and therefore standardized treatment is possible at all times without relying upon the subjectivity and sensations of the operator.

Further, by deleting resembling membership functions, the minimum required number of types of membership functions can be set in advance. Consequently, ineffectual fuzzy reasoning can be eliminated.

The present invention is useful in a case where, when rules for fuzzy reasoning are set and when the set rules are revised, a check is automatically performed to determine whether the membership functions used in these rules include membership functions which resemble each other. In particular, there are instances where similar membership functions happen to be set when correcting rules. The invention may be effectively exploited as an automatic rule checking function in such case.

Furthermore, in a case where a fuzzy reasoning system is contemplated as having a learning function in which rules are set or revised automatically by learning, the analyzing apparatus according to the present invention is essential in order to avoid redundancy of membership functions created by the system.

BRIEF DESCRIPTION OF THE DRAWINGS

FIGS. 1 through 6 illustrate an embodiment of a method and apparatus for setting membership functions according to the present invention, in which:

FIG. 1 is a functional block diagram illustrating the construction of a programming apparatus for fuzzy reasoning rules, as well as the construction of a fuzzy reasoning apparatus;

FIG. 2 illustrates a signal setting table;

FIGS. 3 and 4 are graphs illustrating examples of membership functions having standard shapes;

FIG. 5 illustrates a correspondence table; and

FIG. 6 illustrates an input/output code table.

FIGS. 7 through 9 illustrate an embodiment of a method and apparatus for analyzing membership functions according to the present invention, in which:

FIG. 7 is a functional block diagram;

FIG. 8 is a graph showing an example of a membership function; and

FIG. 9 is a graph showing correlation between membership functions.

BEST MODE FOR CARRYING OUT THE INVENTION

First, an embodiment of a method and apparatus for setting membership functions according to the present invention will be described in detail.

Figure 1:
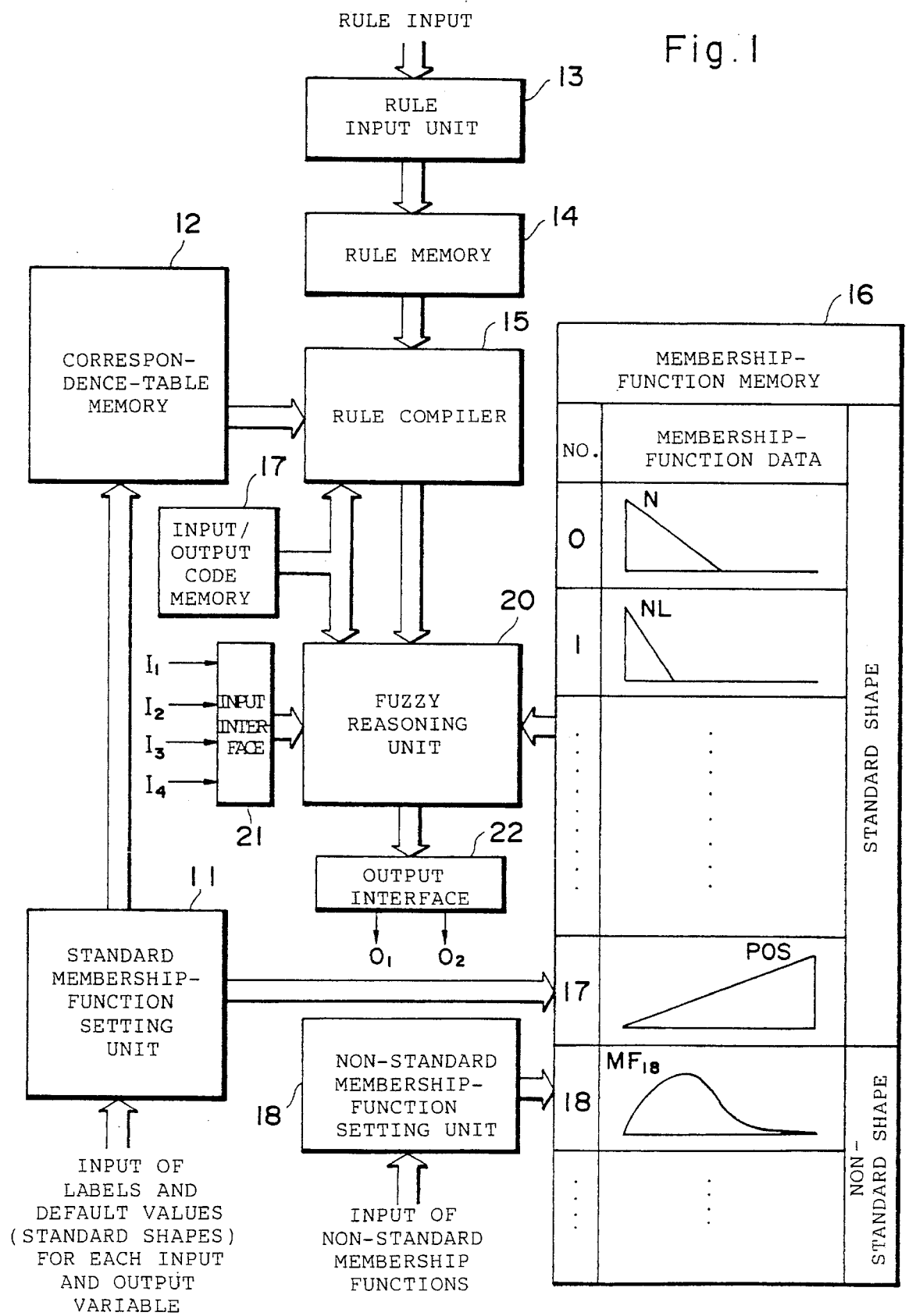

FIG. 1 is a functional block diagram illustrating the construction of a programming apparatus for fuzzy reasoning rules, as well as the construction of a fuzzy reasoning apparatus. This apparatus is capable of being realized ideally by a digital computer system, namely a computer main body which includes a CPU and a memory (a semiconductor memory and a magnetic memory, etc.), an input unit such as a keyboard and mouse, etc., a CRT display unit, and other peripheral equipment.

The programming of fuzzy reasoning rules is accompanied by the setting (registration in memory) of membership functions. In this embodiment, it is possible to set membership functions having standard shapes, as well as membership functions of non-standard shapes. It is assumed that membership functions of either type are such that their shapes are determined on a plane having an X axis of 256 dots and a Y axis of 256 dots. The memory capacity necessary for setting such membership functions will be 256×8 bits=2 K bits per function.

According to this embodiment, it will be assumed for the sake of simplicity that there are four types of input variables and two types of output variables. Also, it will be assumed that the types of membership functions capable of being set with respect to each input and output variable ranges from a minimum to two to a maximum of seven.

The setting of membership functions having standard shapes will be described first.

As shown in FIG. 2, all input and output variables have their respective names (variable names), whether they are an input or an output (I/O) and their ranges of variation decided beforehand. FIG. 2 is referred to as a signal setting table, which is provided in a setting unit 11 for setting standard membership functions. The four types of input variables are represented by $I_1$, $I_2$, $I_3$, $I_4$, respectively, and the two types of output variables are represented by $O_1$, $O_2$, respectively. Also set in the signal setting table are the labels of membership functions used for each input and output variable. These labels are entered when inputting default values, described below. Though labels can be creased using arbitrary symbols, it will be assumed that only the first character uses N, Z or P, where N means negative, Z means zero and P means positive. For example, a label representing a membership function whose linguistic information relates to a negative value always possesses the symbol N at the leading position.

The manner in Which a standard membership function is created is decided in advance. Specifically, membership functions are set by separating given labels into those indicative of negative (N) and those indicative of positive (P), dividing equally the negative region of a variable by the number of negative labels, and dividing equally the positive region of the variable by the number of positive labels.

Figure 3:
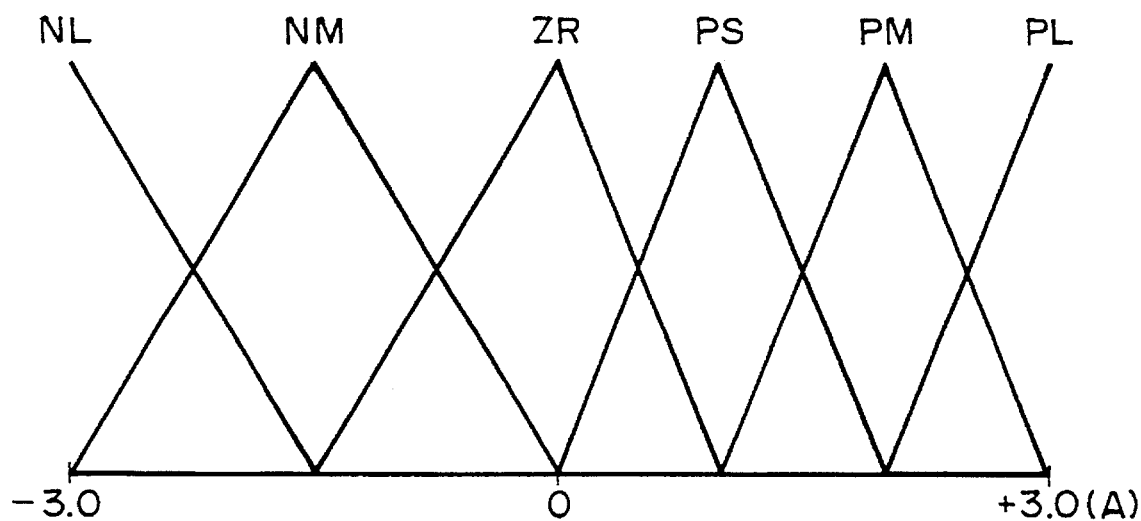

For the sake of simplicity, let the membership functions be triangular in shape. As shown in FIG. 3, six types of standard membership functions NL, NM, ZR, PS, PM, PL are set for the input variable $I_2$, by way of example. Since the negative membership functions are the two types NL and NM, the negative region is divided into two equal parts. Since the positive membership functions are the three types PS, PM and PL, the positive region is divided into three equal parts. Each membership function is formed in such a manner that the apices of the membership functions are situated at the points where equal division takes place and at the left and right ends. The membership function whose label is ZR is formed in such a manner that the apex is situated at the position where the variable is 0. The lengths of the bases of the triangular membership functions are decided in such a manner that neighboring membership functions intersect each other where the grade is 0.5.

Figure 4:
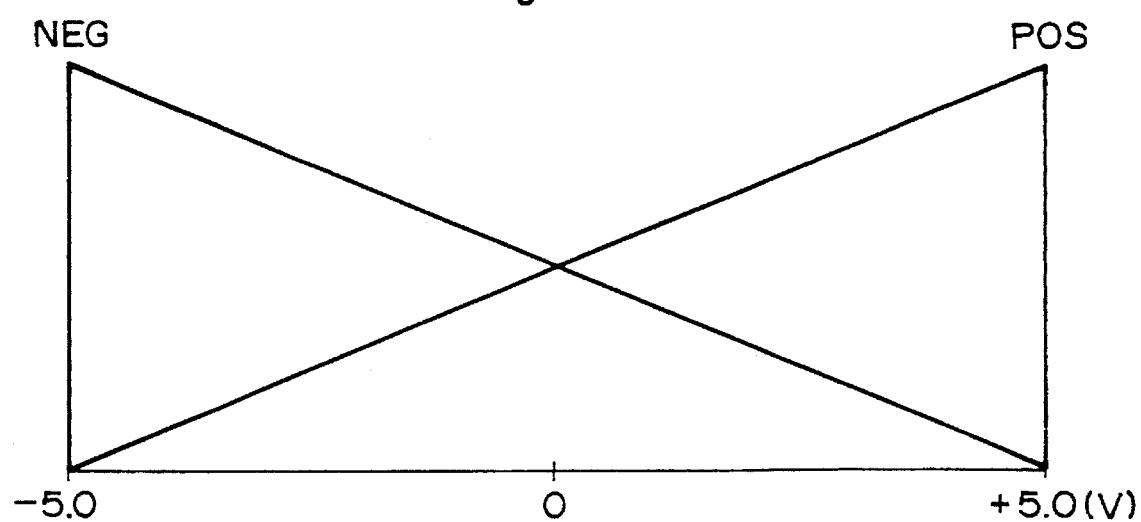

FIG. 4 illustrates standard membership functions of the output variable $O_2$. Since there are two labels of $O_2$, namely NEG and POS, membership functions having peaks at both the right and left ends are formed.

A default value for setting a standard membership function is expressed by NiZjP or NkP, where i represents the number equally dividing the negative region, and j represents the number equally dividing the positive region. For example, the default value relating to the input variable $I_2$ (FIG. 3) is N2Z3P. When a membership function is not set on the negative side or positive side, Ni or jP is omitted. For example, the default value of the input variable $I_3$ is Z2P. NkP is employed in a case where a label starting with the symbol Z is not used, where k represents a number equally dividing the the region between membership functions respectively positioned at positive and negative ends. For example, the default value relating to the output variable $O_2$ (FIG. 4) is represented by N1P.

The operator is capable of setting the standard membership functions, by using the aforementioned default values, for each input and output variable, and of entering the labels of these membership functions, in the setting unit 11 for setting the standard membership functions.

In a case where standard membership functions have been set, the operator is capable of entering rules in a rule input unit 13 using the names of the input and output variables and the labels. For example, a rule is expressed as follows:

If $I_1$= NM, $I_2$= NL, $I_3$= PM $I_4$= N, then $O_2$=NEG

A rule inputted from the rule input unit 13 is stored in a rule memory 14 (i.e., the rule is set).

When a default value is entered, the standard membership-function setting unit 11 assigns a series of different numbers to the standard membership functions created based upon the entered default number, checks to determine whether there are membership functions having identical shapes and, if there are membership functions with identical shapes, assigns the same number to them in order to avoid redundant setting of membership functions. Data representing each standard membership function is stored in a membership-function memory 16 in a form capable of being retrieved, with these numbers serving as the key. Further, the standard membership-function setting unit 11 creates a correspondence table indicating the correspondence among the names of the input and output variables, the labels of the membership functions set for these variables, and the numbers assigned to the labels, and stores this correspondence table in a correspondence-table memory 12. An example of this correspondence-table memory is illustrated in FIG. 5.

The above-described processing in the standard membership-function memory 11 is executed as follows:

The inputted default value is separated into NiZ, iZj, ZjP and NkP. For example, the default value N3Z3P of the input variable $I_1$ is separated into N3Z, 3Z3 and Z3P. Further, the default value Z2P of the input variable $I_3$ is separated into 0Z2 and Z2P.

The default values thus separated are arranged in the ascending order of i, j and k. In this embodiment, the order is N1Z, N2Z, N3Z, 0Z2, 1Z1, 2Z3, 3Z3, Z1P, Z2P, Z3P, N1P. Of those that are redundant, only one is employed and the other is deleted.

Next, in order starting from N1Z, consecutive numbers starting from 0 are assigned, as shown below. The number bracketed by N and Z or by Z and P represents the number of types of membership functions.

N1Z: assigns the number 0 to the label N of input variable $I_4$;

N2Z: assigns the numbers 1 and 2 to NL and NM, respectively, of $I_2$;

N3Z: assigns the numbers 3, 4 and 5 to NL, NM and NS, respectively, of $I_1$ and $O_1$ (since NL, NM and NS of $I_1$ and NL, NM and NS of $O_1$, respectively, are of the same shape, the same number is assigned thereto);

0Z2: assigns 6 to ZR of $I_3$;

1Z1: assigns 7 to Z of $I_4$;

2Z3: assigns 8 to ZR of $I_2$;

3Z3: assigns 9 to ZR of $I_1$ and $O_1$;

Z1P: assigns 10 to P of $I_4$;

Z2P: assigns 11 and 12 to PM and PL, respectively, of $I_3$;

Z3P: assigns 13, 14 and 15 to PS, PM and PL, respectively, of $I_1$, $I_2$ and $O_1$; and N1P: assigns 16 and 17 to NEG and POS, respectively, of $O_2$.

When the numbers thus assigned are registered in correspondence with the labels for each input and output variable, the result is a correspondence table (FIG. 5).

The data representing each membership function of the standard shape is created, and the created membership-function data and assigned numbers are stored in the membership-function memory 16 in such a manner that the consecutive numbers assigned to the data of each label will correspond to these items of data.

When the membership functions are set, there are 28 types (see FIG. 2) but, by virtue of the foregoing processing, only one of the membership functions which are redundant is left and the others are deleted, so that the number of types is reduced to 18. Accordingly, the capacity of the membership-function memory can be reduced. Even if the types of input and output variables are increased in number, the types of membership functions do not increase as much. As a result, the greater the number of types of input and output variables, the more outstanding the effect of reducing memory capacity. Moreover, it is possible to set, for every input variable, a membership function suited thereto.

On the other hand, codes (numbers) are assigned also to the input and output variables $I_1$–$I_4$, $O_1$, $O_2$. These are registered in an input/output code memory 17. The codes assigned to the input/output code variables are illustrated in FIG. 6 (input/output code table).

Thus, fuzzy reasoning rules are inputted from the rule input unit 13 using the names of the input variables and the labels of the membership functions. It is possible for the operator (a human being) to set rules using easy-to-understand linguistic information, and thus a man/machine interface is provided that is easy to handle. The rules thus entered are stored in the rule memory 14.

With regard to the execution of fuzzy reasoning, each rule in the rule memory 14 is sent to a rule compiler 15, where the apparatus converts the rules into codes which are easy to manage. In the rule-code conversion processing, the rule compiler 15 refers to the input/output code memory 17 with regard to input and output variables, and to the correspondence-table memory 12 with regard to labels.

For example, the above-mentioned rule

If $I_1$= NM, $I_2$= NL, $I_3$=PM $I_4$=N, then $O_2$=NEG is converted into the following code (number) string using the codes of the input and output variables and the numbers assigned to the labels:

0, 4, 1, 1, 2, 11, 3, 0, 5, 16

It will be appreciated that the rule data also is compressed.

On the basis of the rules thus compiled, a fuzzy reasoning unit 20 accepts the values of the input variables $I_1$–$I_4$ via an input interface 21, accesses the membership-function memory 16 using the numbers in the rule data, and performs prescribed fuzzy reasoning. The results of fuzzy reasoning are defuzzified and then outputted as $O_1$ or $O_2$ via an output interface 22.

It is possible to set membership functions having any shape (non-standard membership functions) besides the above-described membership functions of standard shape. For this purpose, a non-standard membership-function setting unit 18 is provided. The operator sets the desired membership functions as by entering position using the mouse of the setting unit or entering coordinates from a keyboard, and assigns new numbers (numerals of 18 or greater, for example) to the membership functions. The data representing the entered membership functions is stored in the membership-function memory 16 along with the numbers assigned to these membership functions. The operator is capable of setting non-standard membership functions of any number of types.

The setting unit 18 further possesses a function for checking to see whether an entered membership function has the same shape (inclusive of a similar shape) as one already set. A membership function having the same shape as one already set has a number identical with that of the already set membership function assigned thereto, and this membership function is not registered in the memory 16. The operator is informed of the fact that the shapes are identical and is notified of the assigned number. The numbers which the operator has assigned are missing numbers. Missing numbers can be used when subsequently setting nonstandard membership functions.

In the entry of a rule using such a non-standard membership function, the number thereof is used to designate the membership function (as in the manner of "$MF_{18}$"). A table correlating $MF_{18}$ and number 18 also is stored in the memory 12. It goes without saying that compiling processing and fuzzy reasoning are carried out in exactly the same manner with regard to both standard and non-standard membership functions. It is of course possible to make use of labels (linguistic information) with regard also to the non-standard membership functions.

Though data representing membership functions is stored in the membership-function memory 16 by a table reference method, the membership-function data can be stored and generated also by coordinates and a linear interpolation method or mathematical expression method.

An embodiment of a method and apparatus for analyzing membership functions according to the present invention will now be described in detail.

Figure 7:
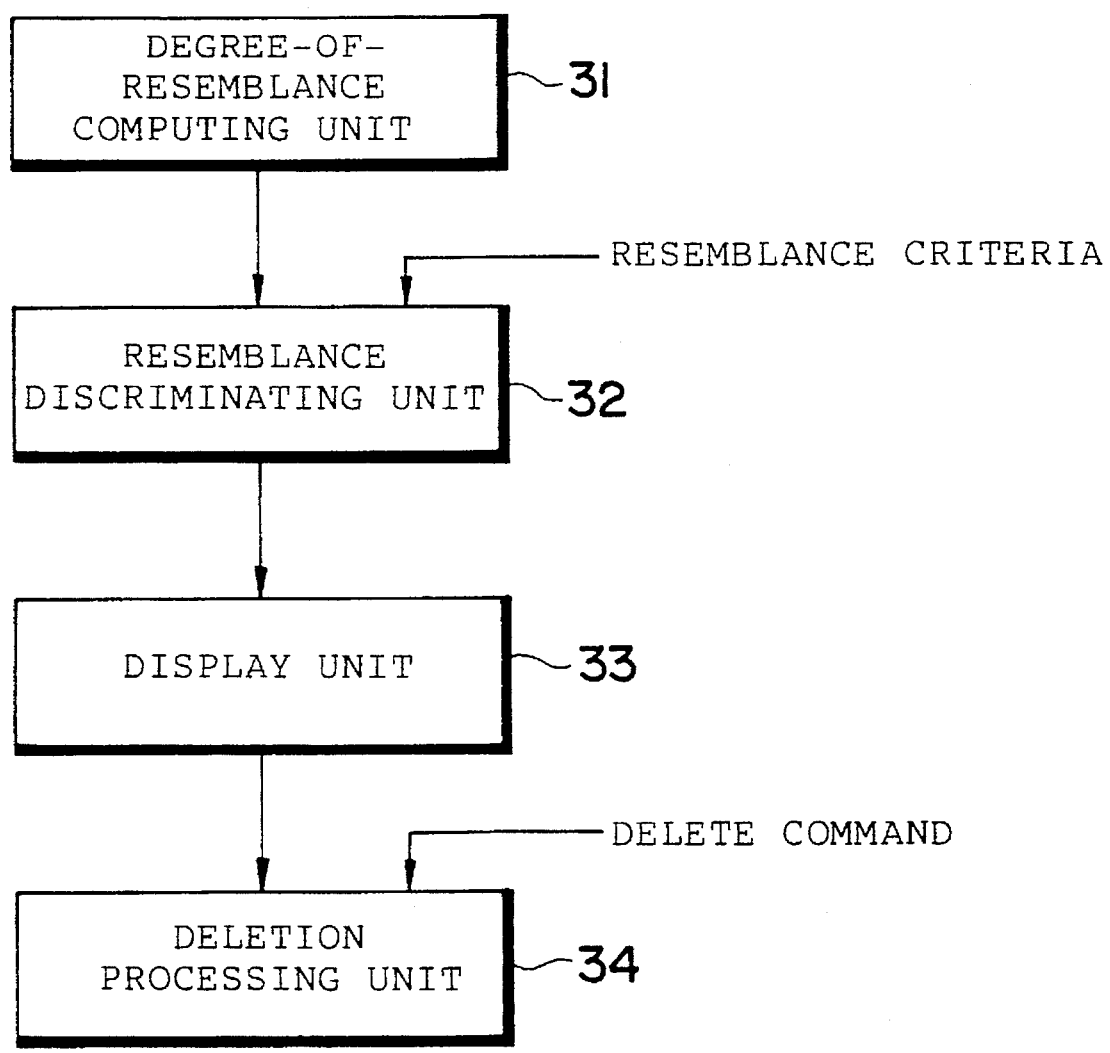

FIG. 7 is a functional block diagram of an apparatus for analyzing membership functions. The analyzing apparatus is realized by a computer which includes a central processing unit (inclusive of a microprocessor), by way of example.

Figure 8:
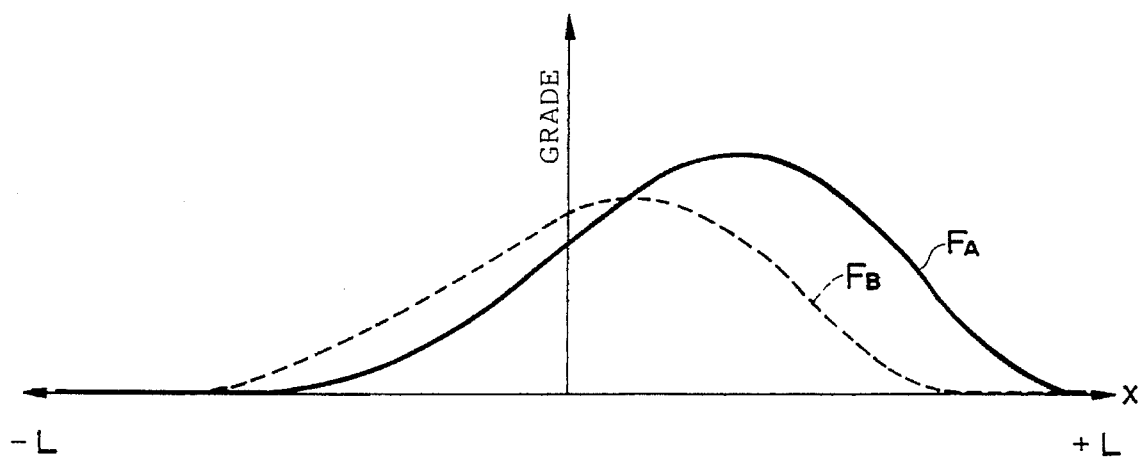

Analytical processing will be described with regard to resemblance (inclusive of identity) between two membership functions $F_A$ and $F_B$, as illustrated in FIG. 8.

First, the degree of resemblance $I(\tau)$ between these membership functions $F_A$, $F_B$ is calculated in a resemblance computing unit 31 by correlating them in accordance with the following equation:

$$I(\tau) = \int_{-L}^{L} F_A(x) \cdot F_B(\tau - x) dx \tag{1}$$

Next, it is determined by a resemblance discriminating unit 32 whether the membership functions $F_A$, $F_B$ can be said to resemble each other. One membership function $F_A$ serves as a reference. The autocorrelation $I_0$ of the membership function $F_A$ serving as the reference is calculated in accordance with the following equation:

$$I_0 = \int_{-L}^{L} F_A(x) \cdot F_A(-x) dx \tag{2}$$

Figure 9:
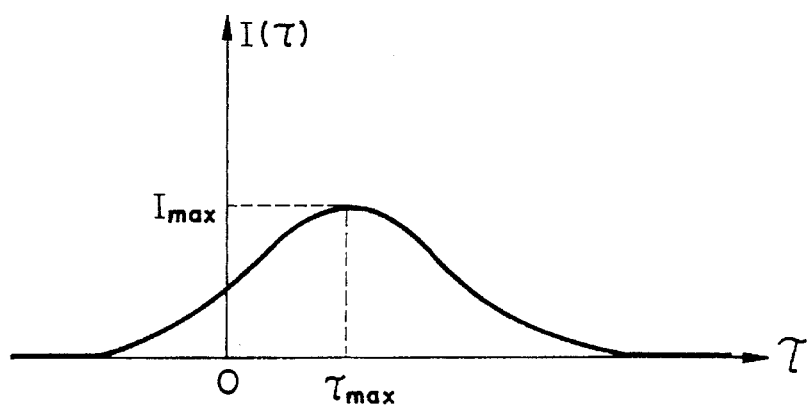

The maximum value $I_{max}$ of the degree of resemblance $I(\tau)$ given by Eq. (1) and the $\tau_{max}$ which gives this maximum value are obtained (see FIG. 9). Use is made of $I_0$ and $I_{max}$ to obtain $\gamma$ from the following equations:

$$\gamma = I_{max}/I_0 \tag{3}$$

$$\tau_{max} \tag{4}$$

The larger $\gamma$ and the smaller $|\tau_{max}|$, the greater the degree of resemblance can be said to be between the membership functions $F_A$ and $F_B$.

Let $\gamma_L$ and $\tau_L$ represent the references (resemblance reference or identity reference) for judging the degree of resemblance. These references are externally applied to the discriminating unit 32. If $\gamma$ and $\tau_{max}$ given by Eqs. (3) and (4) satisfy both $\gamma > \gamma L$ and $|\tau_{max}| < |\tau_L|$, the membership functions $F_A$ and $F_B$ are judged to resemble each other.

The results regarding the resemblance judgment between the membership functions $F_A$ and $F_B$ are displayed on a display unit 33, such as a CRT display device, liquid-crystal display device or plasma display device. If necessary, the results are printed out by a printer.

In a case where there are three membership functions $F_A$, $F_B$, Fj or more, the membership function $F_A$ is taken as the focus and whether or not the other membership functions $F_B$, Fj resemble the membership function $F_A$ can be judged and displayed by the above-described method.

Finally, all of the membership functions judged to resemble one another (or to be identical to one another) with the exception of one (e.g., the membership function $F_A$ serving as the focus is left) are deleted in a deletion processing unit 34.

If the membership functions have been stored in memory, the deletion processing need only clear this area. An arrangement may be adopted in which a deletion signal is generated automatically within a digital computer or the like, or in which the operator enters the signal upon observing the display.

Industrial Applicability

The method and apparatus for setting membership functions, as well as the method and apparatus for analyzing membership functions, in accordance with the present invention are utilized when setting fuzzy reasoning rules in a fuzzy reasoning system, and in refining and improving reasoning rules after they have been set.

What is claimed is:

1. An apparatus for setting membership functions, which comprises:

a setting means for setting membership functions and corresponding identification codes for input and output variables, each of said membership functions having a predefined shape;

means for checking whether there is identity in shape among membership functions set for each input and output variable and for each identification code;

means for assigning different identification numbers to set membership functions which are different in shape from one another and identical identification numbers to set membership functions processing an identity in shape;

a first memory device for storing data, which represents a set membership function, in corresponding with the identification number assigned thereto; and a second memory device for storing in a correlated manner names of the input or output variables, the identification numbers assigned to the differently shaped membership functions associated with respective input or output variables, and the identification codes of the membership functions which correspond to the identification numbers.

2. An apparatus for setting membership functions according to claim 1, wherein said identification codes of the membership functions are items of linguistic information representing characterizing features of the membership functions.

3. An apparatus for setting membership functions according to claim 1, further comprising means for forming membership functions of a standard shape for each of the input and output variables in dependence upon number of types of membership functions required to express positive variables and the number of types of membership functions required to express negative variables.

4. A method of setting membership functions, which comprises:

setting membership functions and corresponding identification codes for input and output variables, each of said membership functions having a predefined shape;

checking whether there is identity in shape among membership functions set for each input and output variable and for each identification code;

assigning different identification numbers to set membership functions which are different in shape from one another and identical identification numbers to membership functions possessing an identity in shape;

storing, in first memory means, data representing set membership functions in correspondence with the identification number assigned thereto; and storing, in second memory means, and in a correlated manner, names of the input or output variables, the identification numbers assigned to the differently shaped membership functions associated with respective input or output variables, and the identification codes of the membership functions with correspond to the identification numbers.

5. An apparatus for analyzing membership functions comprising:

a setting unit for setting a plurality of membership functions;

means for calculating a degree of resemblance between two set membership functions by correlating the two set membership functions;

means for comparing the calculated degree of resemblance with a predetermined reference value and outputting an indication of at least those membership functions judged to resemble each other; and means for deleting from said set membership functions one membership function of the set membership functions which is judged to resemble another membership function of the set, and leaving the other set membership functions intact thereby reducing a capacity of a membership-function memory.

6. An apparatus for analyzing membership functions according to claim 5, wherein said means for calculating a degree of resemblance calculates a ratio of a maximum value of a cross-correlation function of the two membership functions to an autocorrelation value of one of the two membership functions, as well as a value of a variable of a cross-correlation function which gives the maximum value of said cross-correlation function; and said comparing and outputting means judges that the two membership functions resemble each other when said ratio is greater than a first reference value and the value of said variable is less than a second reference value.

7. A method of analyzing membership functions, which comprises:

setting a plurality of membership functions;

calculating a degree of resemblance between two set membership functions by correlating the two set membership functions;

comparing the calculated degree of resemblance with a predetermined reference value and outputting an indication of at least those membership functions judged to resemble each other; and deleting one membership function from the set membership functions which is judged to resemble another membership function of the set, and leaving intact the other membership functions of the set thereby reducing a capacity of a membership-function memory.

8. A method of analyzing membership functions according to claim 7, wherein a ratio of a maximum value of a cross-correlation functions of two membership function to an autocorrelation value of one membership function, and a value of a variable of a cross-correlation function which gives the maximum value of said cross-correlation function, are calculated; and the two membership functions are judged to resemble each other when said ratio is greater than a first reference value and the value of said variable is less than a second reference value.

* * * * *